United States Patent

[11] 3,585,889

[72] Inventor  Alfredo Rabal
              Calle 33 No. 465-LaPlata-Province de,
              Buenos Aires, Argentina
[21] Appl. No. 800,605
[22] Filed     Feb. 19, 1969
[45] Patented  June 22, 1971
[32] Priority  Mar. 20, 1968
[33]           Argentina
[31]           213,175

[54] MACHINE TO CUT PLASTIC MATERIALS
     3 Claims, 6 Drawing Figs.
[52] U.S. Cl. .................................... 83/171,
                                     30/117, 83/427
[51] Int. Cl. ................................... B26d 7/10
[50] Field of Search .......................... 83/170,
              171, 427, 201.02, 201; 30/116, 117

[56]                  References Cited
                 UNITED STATES PATENTS
Re.14,542  10/1918  Embree ..................  83/427
1,186,702   6/1916  Sporleder ..............  83/427 X
1,515,619  11/1924  Runnels ................  83/427 X
1,955,004   4/1934  Lodge ..................  30/116 UX
2,018,831  10/1935  Boker ..................  83/427 X
2,789,199   4/1957  Bjorksten ..............  83/171
2,862,231  12/1958  Voight .................  83/171 X
3,259,004   7/1966  Chisholm ...............  83/171

Primary Examiner—Frank T. Yost
Attorney—Michael S. Striker

ABSTRACT: A machine for severing plastic material in which an elongated severing element in form of a metal band or wire is reciprocated at high speed while the plastic material is pushed thereagainst so that the heat resulting from the friction between the reciprocating severing element and the plastic material will sever the latter.

PATENTED JUN 22 1971 3,585,889
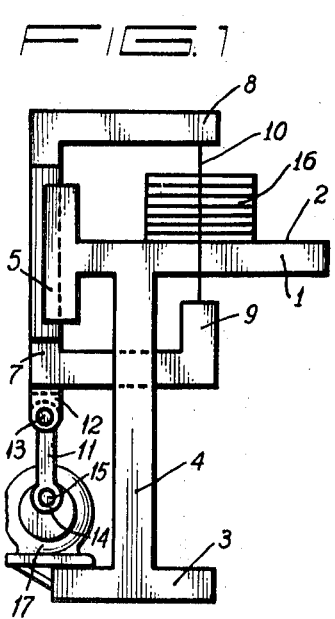
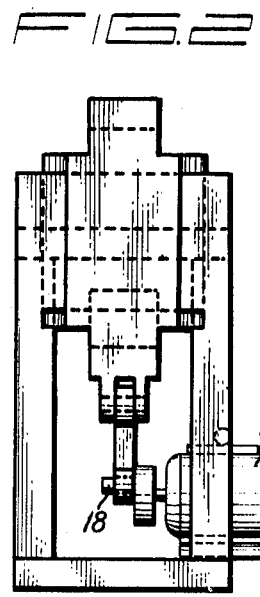
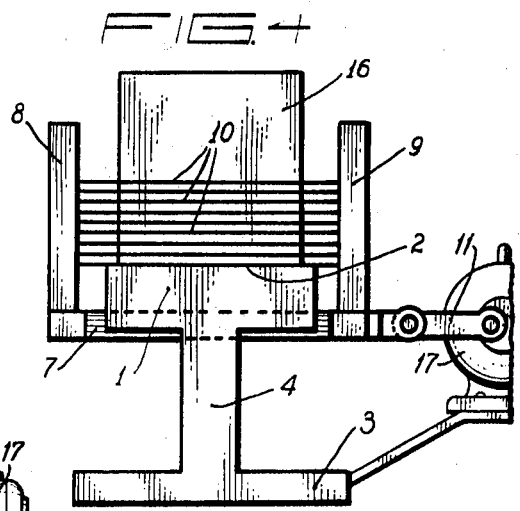
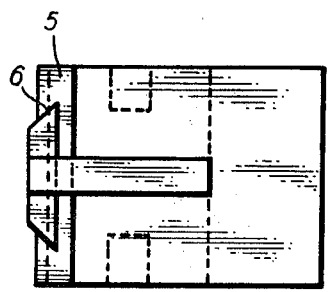
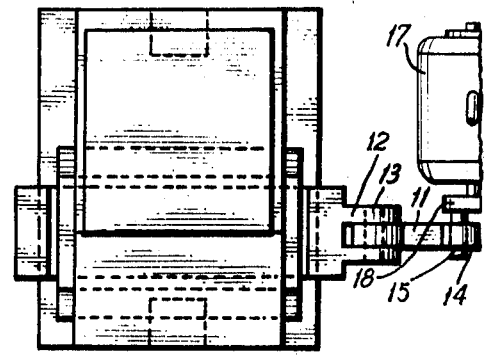
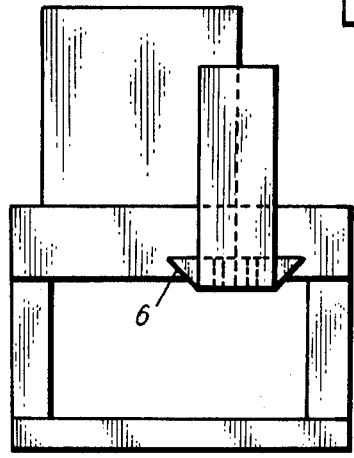
INVENTOR.
ALFREDO RABAL
BY Michael J. Striker

MACHINE TO CUT PLASTIC MATERIALS

The present invention deals with a new machine to cut plastic materials of low fusion point such as expanded polyestirene, acrylic, etc. Said machine comprises at least one severing element which may be in the form of a metal ribbon or wire actuated by a to-and-fro movement capable of developing by friction the heat necessary to separate the plastic material and thus produce the cut.

Up to the present time, apart from the common systems of using a saw or sharp tool, the most practical procedure is to use a resistance wire fed by electric current which cuts by melting part of the material it touches. This procedure causes waste of the material through melting not under 1 millimeter per cut. Besides, the resulting surface is rough and scaly.

With the machine of the present invention practically no waste of material, since there is no melting or shavings of any kind will be produced. Besides, the cut is much more even and the surface obtained is quite smooth, which greatly facilitates painting thereof. In the experiments made, it has been possible to verify that a drawing on a piece of plastic cut into many pieces is not distorted upon joining again the pieces. If it is kept in mind that it is a relatively expensive material, sold in the trade in sheets up to 5 mm. thick, it will be easy to understand that the saving thereof is important, since it may attain as much as 20 percent. Besides, with the procedure used in the country and in all industrialized areas, based on the use of an electrically heated resistance wire, if the cutting operation is stopped, even only for a few seconds, there results imperfection on the surface of the sheets, which does not happen with the machine of this invention that may be stopped without the least inconvenience. This is a very important factor which contributes to the quality and economy of manufacture.

So that the present invention may be clearly understood, it will be described in detail hereunder, in two ways to put it into practice, referring to the illustrative drawings annexed hereto, in which:

FIGS. 1 and 2 are elevational views of a machine using only one metal ribbon or wire to cut several sheets. In this case, the vertical position has been chosen as most suitable.

FIG. 3 is a top view of the same machine.

FIGS. 4 and 5 are elevational views of a machine arranged horizontally and using a plurality of metal wires or ribbons to cut plates from a solid block.

FIG. 6 is a top view of the same machine. In all said figures the same reference numbers point to equal or corresponding parts.

Referring now to the illustrating drawings annexed, 1 is a support structure with a smooth upper surface at 2 acting as a table. 3 is a base or pedestal joining 1 by means of the legs or supports 4. At the end of and at right angles to 1, a guide 5 having a dovetailed groove 6 is fixed to the support. A substantially U-shaped frame 7 having a pair of arms 8 and 9 is mounted in the guide groove 6 for reciprocating movement and a severing element 10 in form of a metal ribbon or wire is fixed to and extends in taut condition between the arms. 11 is a connecting rod connected to frame 7 through the fork 12 and the joining bolt 13. The head 14 of the connecting rod joins through a bolt 15 a motor unit 17 providing a to-and-fro movement through a crankshaft 18; 16 is the material to be cut. Through a to-and-fro movement of the connecting rod 11, the latter transfers its motion to the frame 7 sliding in the dovetail groove 6. This frame 7 takes along the metal wire or ribbon 10 extending in taut condition between the arms 8 and 9. The ribbon or wire 10 when moving produces friction heat and separates the molecules of the material 16 when this is pushed against the wire, producing a cut. This wire may be replaced to advantage with a ribbon sharpened or not, to cut flat surfaces and without increasing its thickness, its tensile strength increases in relation to its width. While in the embodiment shown in FIGS. 1—3 the frame 7 is reciprocated in vertical direction, FIGS. 4—6 illustrates a second embodiment in which the frame 7 is reciprocated in horizontal direction and wherein a plurality of severing elements 10 extend parallel to each other between the arms 8 and 9. It is stated hereby that the present invention is not limited to the examples described and represented, but rather, it may be the object of alterations in form or detail to be comprised within the scopes of this invention, and clearly set forth in the claims following the present description.

I claim:

1. A machine for cutting plastic material comprising support means having a flat substantially horizontal upper surface for supporting thereon the plastic material to be cut; stationary guide means fixed to said support means; a substantially U-shaped frame having a base mounted in said guide means for reciprocating movement and a pair of arms projecting respectively from opposite ends of said base; a plurality of elongated, thin severing elements fixed substantially parallel and uniformly spaced from each other at opposite ends thereof to said arms and extending in taut condition therebetween; a single motor having a drive shaft; and transmission means including an eccentric connecting said drive shaft to said frame for reciprocating the latter and said severing element fixed thereto in substantially horizontal direction, whereby plastic material on said surface may be pushed against said reciprocating severing element so that the heat developed by friction between the reciprocating severing element and the plastic material will sever the latter.

2. A machine as defined in claim 1, wherein each of said severing elements is formed by a metal wire.

3. A machine as defined in claim 1, wherein each of said severing elements is formed by a metal band.